Sept. 30, 1930.　　　　M. KASSER　　　　1,777,000

THERMOSTATIC SWITCH

Filed Sept. 3, 1927　　　　2 Sheets-Sheet 1

INVENTOR
Morris Kasser
BY John Flam
HIS ATTORNEY

Sept. 30, 1930.    M. KASSER    1,777,000
THERMOSTATIC SWITCH
Filed Sept. 3, 1927    2 Sheets-Sheet 2
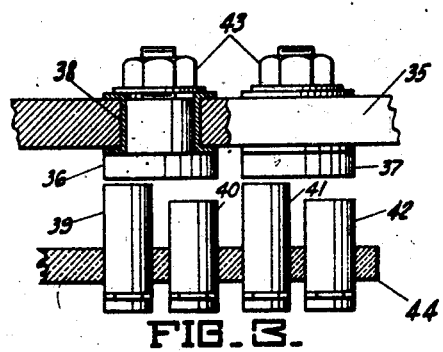
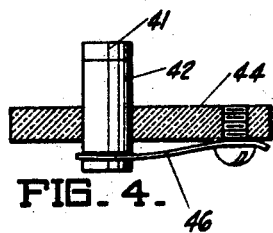
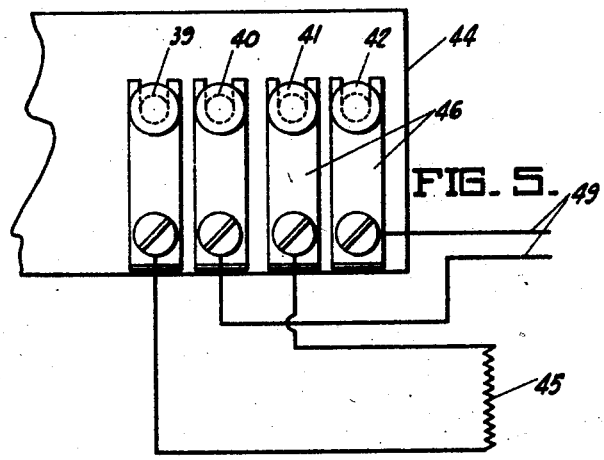
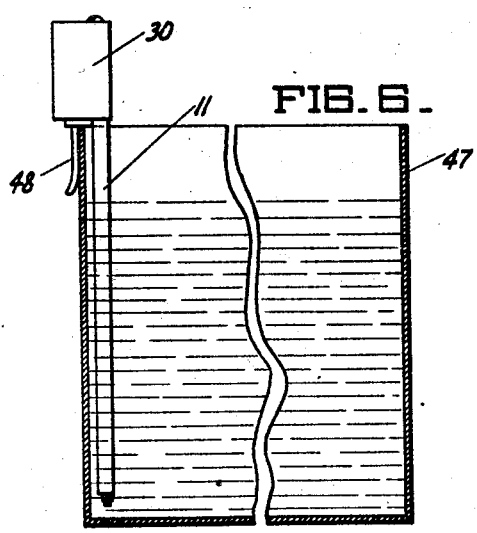
INVENTOR
Morris Kasser
BY John Flam
HIS ATTORNEY Patented Sept. 30, 1930

1,777,000

UNITED STATES PATENT OFFICE

MORRIS KASSER, OF SAN FRANCISCO, CALIFORNIA, ASSIGNOR TO KASSER EGG PROCESS CO., OF SAN FRANCISCO, CALIFORNIA, A CORPORATION OF CALIFORNIA

THERMOSTATIC SWITCH

Application filed September 3, 1927. Serial No. 217,521.

This invention relates to a thermostat, and especially to one which operates to control an electric circuit in accordance with temperature changes.

In many types of apparatus, an electric heating device is utilized; as for example, for heating liquids that are used in processes for preserving eggs. In such and similar systems, care must be taken to limit the maximum attainable temperatures; and this can be done by breaking the electric circuit for the heating elements when the desired maximum temperature is reached. The breaking of this circuit should be accomplished at a fast rate, so as to insure against sparking and other bad effects.

In the use of well-known forms of thermostats, the operation is sluggish, with the result that the breaking of the circuit results in serious arcing and sparking. It is one of the objects of my invention to provide a quick acting thermostat, and powerful enough to break a weld at the contacts.

It is another object of my invention to improve in general the structure and operation of thermostats.

Usually a thermostat is arranged so that it moves in response to temperature variations, and this movement is caused to perform a controlling function. It is another object of my invention to utilize such a construction for a thermostat that by mere duplication of parts, the motion of the thermostat can be multiplied, whereby a very fast movement can be secured.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claim.

Referring to the drawings:

Figs. 3 and 4 are diagrammatic views, mainly in section, of the contacts that are controlled by the thermostat;

Fig. 5 is a diagrammatic wiring of a circuit that can be controlled by the thermostat; and Fig. 6 is a view of a tank having liquid therein and illustrating how the thermostat can be supported therein to control the temperature of the liquid.

Figure 1:
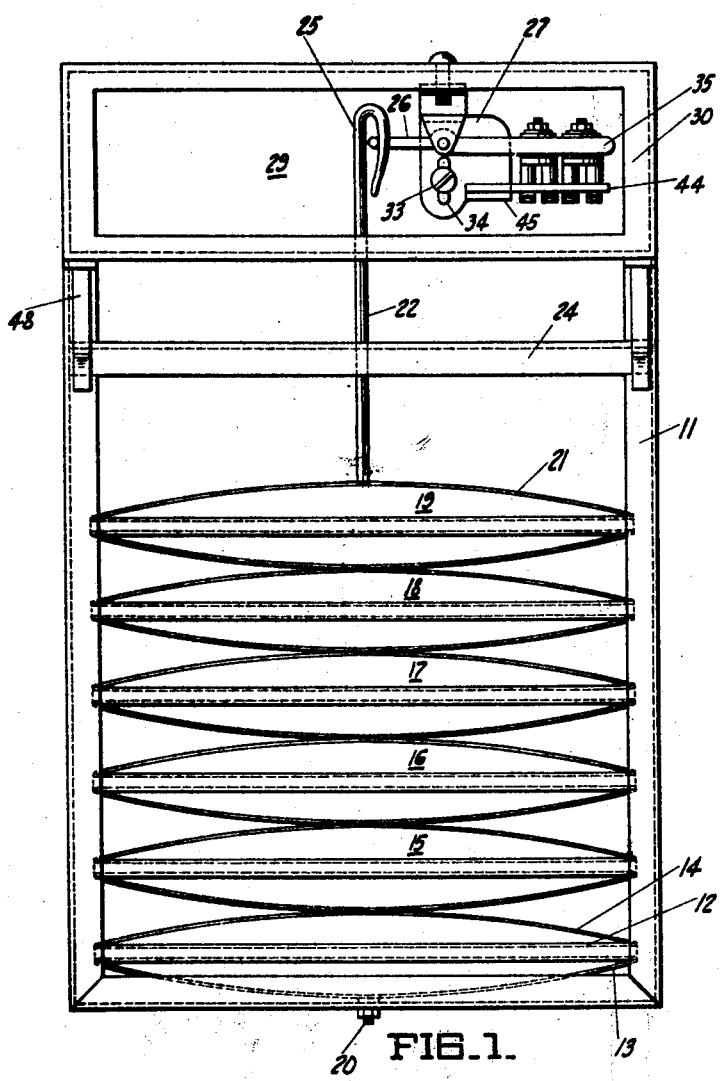
Figure 1 is a front elevation of a thermostat and switches controlled thereby, which incorporate my invention.
Figure 2:
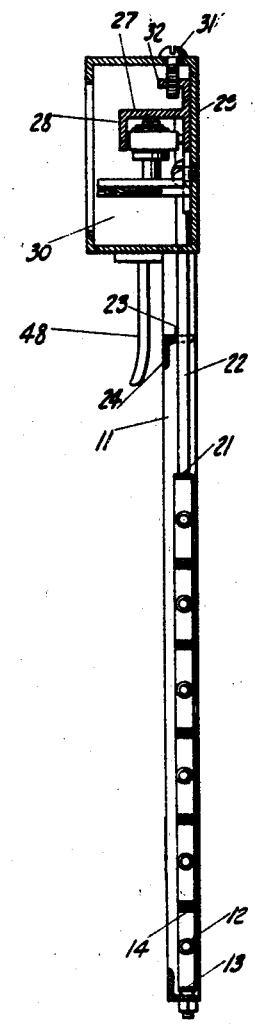
Figure 2 is a vertical section thereof.

Referring to Figs. 1 and 2, I show an open frame 11 that can conveniently be made from angle irons, and that can serve to support all of the parts of the thermostat. The thermostatic elements extend across this frame and are exposed to be acted upon by the surrounding medium the temperature of which is to be controlled. The thermostat utilizes the principle that some materials expand more than others for the same temperature difference; for example, brass expands much more than iron or steel. This is used to vary the shape of a structure in a novel manner.

Thus for example, a brass tube 12 can have a pair of steel spring elements 13 and 14 associated with it, these elements being much longer than tube 12 but connected at their ends as by brazing to the ends of the tube. In this way, a double bow structure is secured. Now if this structure be subjected to a higher temperature, the tube 12 will expand much more than the bows 13 and 14. The result will be a flattening of the bow, the centre points of the bow being brought closer to the axis of tube 12. Thus if one bow such as 13 be fixed at its middle point, the centre of the other bow will move toward and from the said fixed point and this movement can be used to control a switch.

However, it is evident that the elements just described can be duplicated, and by joining them at the arches, the movement of the entire series of bows will be added together. Thus there are shown five additional double bow units 15, 16, 17, 18 and 19, brazed or welded together at the centre of the bows to form a vertical series. The total movement is thus six times that of each individual unit. Furthermore, the brass rods 12 are hollow to permit the fluid which is controlled to pass through it and to influence it more readily.

The lowermost bow 13 is rigidly fastened to the bottom of frame 11, as by the bolt 20, the head of which is brazed or welded or otherwise attached to the centre of the bow. The topmost bow 21 has fastened to it a rod or bar 22 serving as the operating rod for a switch structure. This rod is guided in a slot 23 in the horizontal brace 24 of frame 11. It is evident that when the temperature increases, the rod 22 is pulled downwardly, because the bow structures flatten. This movement is fast, due to the large number of units utilized. The rod 22 can be mechanically arranged in any appropriate manner to control a switch. In the present instance, it is shown as having a hook 25 that pulls on a lever 26 whenever the temperature reaches a definite value. This lever 26 is pivoted on a support 27 having a projecting ear 28. This ear forms one of the spaced bearings for the pivot of lever 26. The support 27 is arranged to be adjustable with respect to rod 22, whereby it is possible to determine at what temperature rod 22 is shortened sufficiently to cause the end of lever 26 to be engaged by the hook 25.

For this purpose, support 27 is slidable on the wall 29 of a casing 30 supported at the top of frame 11. It can be slid up or drawn by the aid of screw 31 passing through the top of casing 30 and tapping into the projection 32 on support 28. In order to hold the support 27 in place, screw 33 is used, tapping into wall 29 and passing through slot 34 in support 27.

Lever 26 can operate contacts that control a heating circuit. For this purpose, the lever extension 35 (Figs. 1 and 3) carries contacts 36, 37, which are insulated as by bushings 38 from the lever. This pair of contacts serves to bridge the contacts 39, 40 and 41, 42. The contacts 36, 37 are held in place by nuts 43 engaging threaded posts on the contacts.

The contacts 39, 40, 41, 42 project through the insulation support 44. This support is held on support 27 by the aid of tongue 45 on support 27. These contacts are urged upwardly by the flat springs 46 fastened to the bottom of insulation 44 and bifurcated at their free ends to engage in grooves in contacts 39 to 42.

It is to be noted that these contacts are alternately long and short. In this way the contacts 36 and 37 first leave the shorter posts 40, 42, and then later, the posts 39, 41, as the arm 26 is pulled downwardly. In this way, the breaking of the circuit is accomplished in two steps, and sparking is reduced. The extension 35 has sufficient weight to deflect springs 46 and to cause contacts 36 and 37 to complete the circuits.

In Fig. 5, I indicate the wiring for the system. The heating unit 45 is shown as arranged to be fed from mains 49. When the contacts 36 and 37 are in engagement with contacts 39, 40 and 41, 42 respectively, the circuit is completed through these contacts and the unit 45. However, when the contacts separate, the circuit is broken at both terminals of the unit.

In Fig. 6 I show a tank 47 holding oil or other liquid, the temperature of which is to be controlled. The thermostat casing 11 can be supported inside the tank and adjacent the side thereof, as by the aid of the clips 48 fastened to the casing 11 and serving to engage one of the walls of the tank.

It is also to be noted that although the rod 22 acts on the contacts with a small leverage, nevertheless the thermostat has sufficient power to break any weld inadvertently produced between the contact points.

I claim:

In a thermostat adapted to be immersed in a fluid and to be subjected to the temperature thereof, a series of straight, hollow rods open at each end having a large coefficient of expansion, a pair of bowed, resilient rods associated with each hollow rod and having a small coefficient of expansion, said bowed rods being connected at their ends to the ends of the straight rod but on opposite sides thereof to form a double bow structure, and means whereby these double bow structures are joined together at the top of the arches.

In testimony whereof I have hereunto set my hand.

MORRIS KASSER.